United States Patent
Uehara et al.

[11] Patent Number: 5,920,668
[45] Date of Patent: Jul. 6, 1999

[54] COMPACT FIBER LASER UNIT

[75] Inventors: Yuzuru Uehara; Jorge W. Jiménez; Michelle L. Stock; Martin E. Fermann, all of Ann Arbor, Mich.

[73] Assignee: IMRA America, Inc., Ann Arbor, Mich.

[21] Appl. No.: 08/957,332

[22] Filed: Oct. 24, 1997

[51] Int. Cl.⁶ .................................................. G02B 6/26
[52] U.S. Cl. ................................ 385/27; 372/6; 356/350
[58] Field of Search ........................... 385/24, 27, 33, 385/34, 89; 372/40, 6, 22, 70, 71, 69, 75, 107; 359/341; 356/350, 345

[56] References Cited

U.S. PATENT DOCUMENTS

| | | | |
|---|---|---|---|
| 5,243,671 | 9/1993 | Koteles et al. ........................ | 385/31 |
| 5,303,314 | 4/1994 | Duling, III et al. . | |
| 5,448,579 | 9/1995 | Chang et al. . | |
| 5,530,787 | 6/1996 | Arnett . | |
| 5,546,482 | 8/1996 | Cordova et al. . | |
| 5,570,449 | 10/1996 | Hutchinson et al. . | |
| 5,773,345 | 6/1998 | Ota ........................................ | 438/286 |
| 5,774,619 | 6/1998 | Bruesselbach ....................... | 385/137 |
| 5,805,758 | 9/1998 | Kim ..................................... | 385/137 |

*Primary Examiner*—Akm E. Ullah
*Attorney, Agent, or Firm*—Burns, Doane, Swecker & Mathis, LLP

[57] ABSTRACT

A compact fiber laser unit includes a laser source, a laser oscillator connected to the laser source for generating an optical and a laser amplifier connected to the laser oscillator for amplifying the optical pulse produced by the laser oscillator. The laser oscillator includes a first optical fiber that connects bulk components of the laser oscillator to the laser source and the laser amplifier includes a second optical fiber that connects bulk components of the laser amplifier to the laser source. The first and second fibers are wound around a common holder in the form of a fiber tray. The fiber tray is connected to a fiber bench and the bulk components of the laser oscillator and the laser amplifier are mounted on the fiber bench.

19 Claims, 7 Drawing Sheets

COMPACT FIBER LASER UNIT

FIELD OF THE INVENTION

The present invention generally relates to lasers, and more particularly pertains to fiber lasers that include a laser oscillator and a laser amplifier, both provided with optical fibers.

BACKGROUND OF THE INVENTION

Lasers are used in a variety of different areas for performing a variety of different functions, Lasers can be designed to produce a continuous emission or a pulsed emission. For pulsed emission systems, it has been found that optical fibers such as Erbium doped fibers represent a particularly preferred gain medium for generating short optical pulses. However, optical fibers are extremely fragile and thus require great care in handling and usage. In one respect, if the optical fiber is bent too sharply (i.e., if the optical fiber is bent so as to possess an excessively small radius of curvature), signal loss can occur if some of the transmitted light leaks out of the fiber at the bend. Further signal degradation can occur if the radius of curvature of the optical fiber is so small that micro cracks are introduced into the fiber. Thus, for a given fiber, there exists a critical radius which is defined as the minimum radius of curvature for the fiber that will avoid the aforementioned problems.

In lasers that employ optical fibers such as Erbium doped fibers, the optical fiber must be of sufficient length, for example on the order of 2–3 meters, to achieve proper operating effectiveness of the laser. There is, however, also a desire to make the optical fiber laser as compact as possible. This objective of producing a compact laser is oftentimes difficult to achieve while at the same time satisfying the requirements that the optical fiber possess sufficient length and that the optical fiber not be bent so sharply as to possess a radius of curvature less than the critical radius.

U.S. Pat. No. 5,530,787 discloses a particular construction for a curved fiber guide that is designed to receive and guide a fiber in such a way as to avoid bending the fiber too sharply. While this proposal may be acceptable from the standpoint of ensuring that the fiber is not excessively bent, it suffers from the disadvantage that it is not well suited for use in constructing a relatively compact laser.

In light of the foregoing, a need exists for an optical fiber laser unit which is relatively compact in size while at the same time providing an optical fiber of sufficient length to operate effectively.

A need also exists for an optical fiber laser unit which is relatively compact in size yet which does not require that the optical fiber be bent so sharply that its radius of curvature is less than the critical radius.

It would also be desirable to provide a compact optical fiber laser unit that includes both a laser oscillator which produces optical pulses and a laser amplifier that amplifies the optical pulses to produce an optical pulse output of desired power.

SUMMARY OF THE INVENTION

According to one aspect of the invention, a fiber laser unit includes a laser oscillator for generating an optical pulse and a laser amplifier connected to the laser oscillator for amplifying the optical pulse produced by the laser oscillator. The laser oscillator includes a first optical fiber and the laser amplifier includes a second optical fiber. The first and second optical fibers are positioned on a common holder to thereby provide a compact laser unit.

According to another aspect of the invention, a fiber laser includes a first pump laser for producing pump light, a laser oscillator connected to the first pump laser by way of a first optical fiber for generating an optical pulse, a second pump laser for producing pump light, and a laser amplifier connected to the second pump laser by way of a second optical fiber and connected to the laser oscillator for amplifying the optical pulse produced by the laser oscillator. The first and second pump lasers are mounted on a common mounting structure and are oriented substantially parallel to one another.

According to a further aspect of the invention, a fiber laser includes a laser source for producing laser light, a laser oscillator connected to the laser source for producing optical pulses, and a laser amplifier connected to the laser source. The laser oscillator and the laser amplifier both include a plurality of bulk components. A coupler optically couples the laser oscillator to the laser amplifier, with the optical pulses produced by the laser oscillator being directed to the laser amplifier for amplification to produce amplified optical pulses as an output. The bulk components of the laser amplifier, the bulk components of the laser oscillator and the coupler are mounted on a common mounting structure so that the bulk components are fixed in place once optical alignment has been properly adjusted.

BRIEF DESCRIPTION OF THE DRAWING FIGURES

The foregoing and additional details and features of the present invention will become more apparent from the following detailed description considered with reference to the accompanying drawing figures in which like elements are designated by like reference numerals and wherein.

DETAILED DESCRIPTION OF THE INVENTION

In accordance with the present invention, a fiber laser unit is provided that includes the combination of a laser amplifier and a laser oscillator. Both the laser amplifier and the laser oscillator include a doped optical fiber. The laser unit is particularly designed and constructed to be relatively compact in size by arranging all of the parts of the laser unit on a common mounting structure and by positioning the parts in a space efficient manner. The fiber laser unit is also specifically designed so that the doped fibers are positioned in a manner that ensures that the smallest radius of curvature is equal to or greater than the critical radius. The critical radius of the doped fibers is defined as the smallest radius of curvature at which the fibers can be bent or curved without significant signal degradation and without damaging the fiber.

Figure 1:
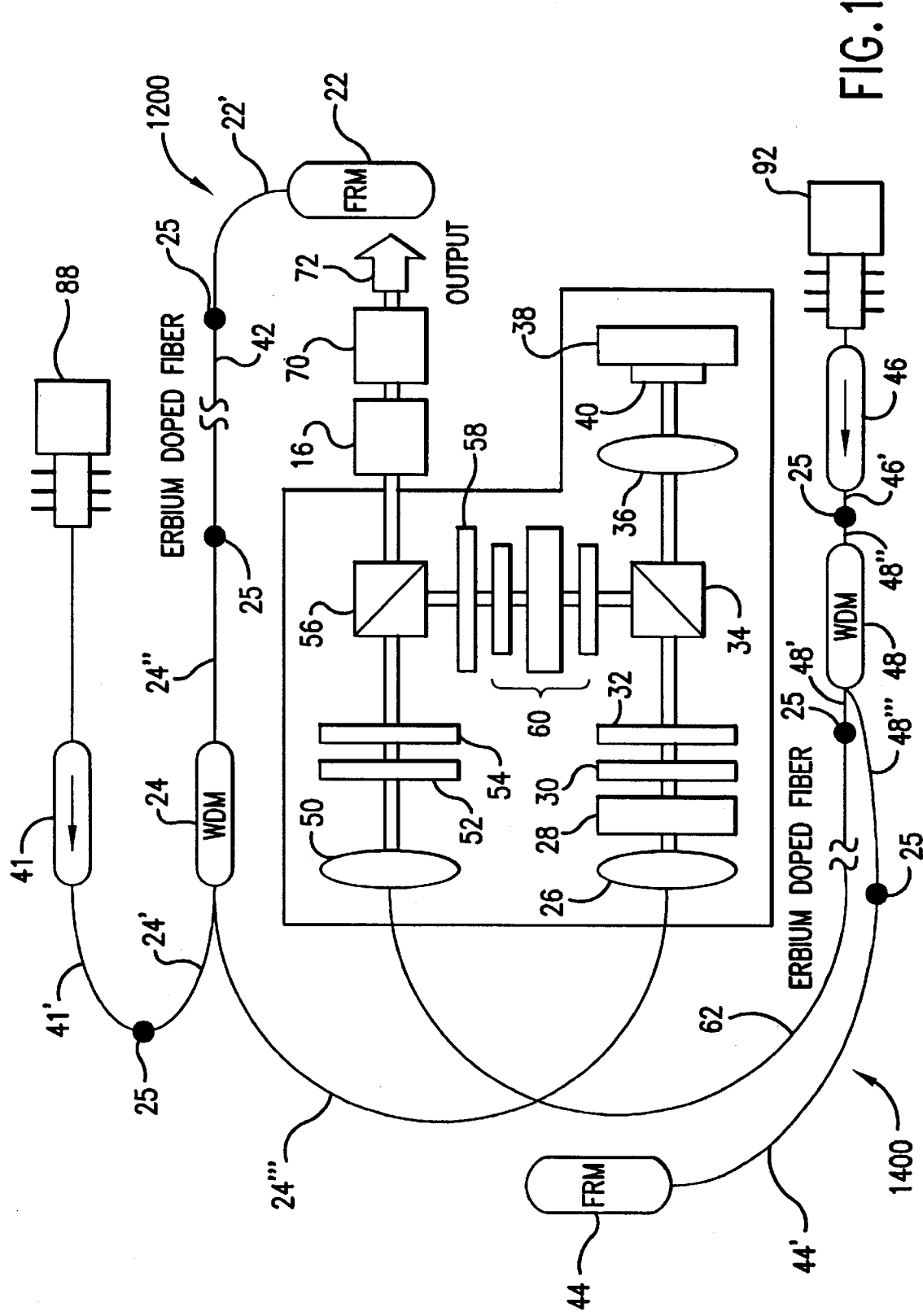
FIG. 1 is a schematic illustration of the fiber laser unit according to the present invention illustrating the layout of various components comprising the laser unit.
Figure 2:
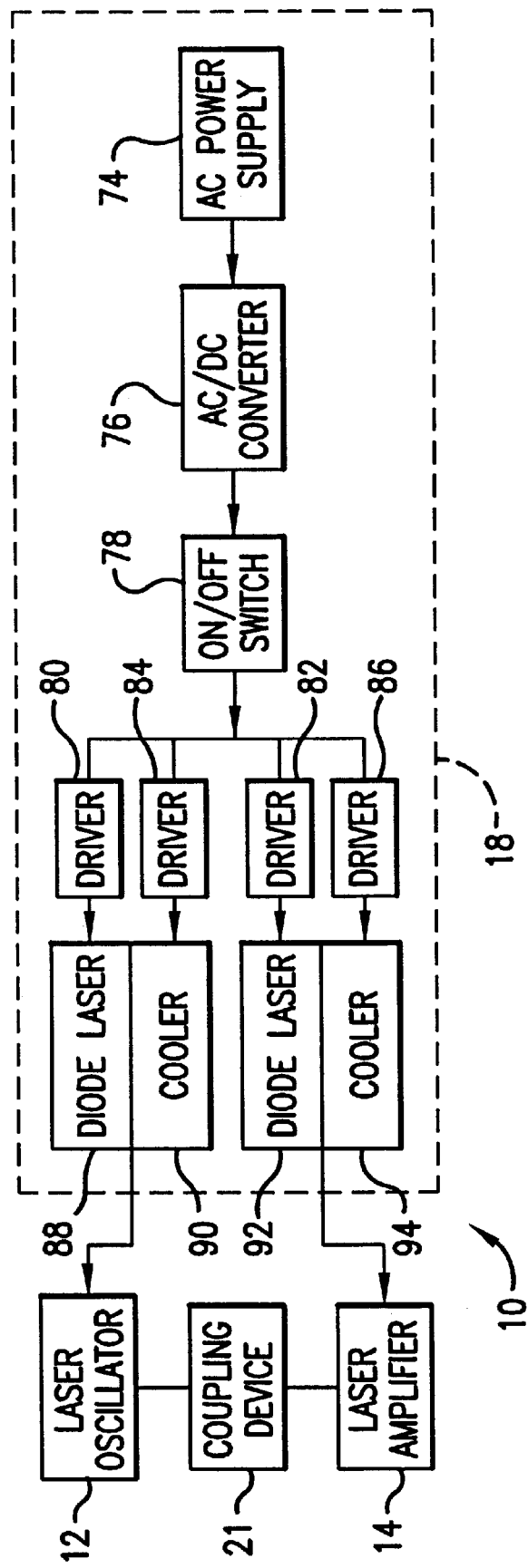
FIG. 2 is a block diagram illustrating various additional components associated with the fiber laser unit of the present invention.
Figure 9:
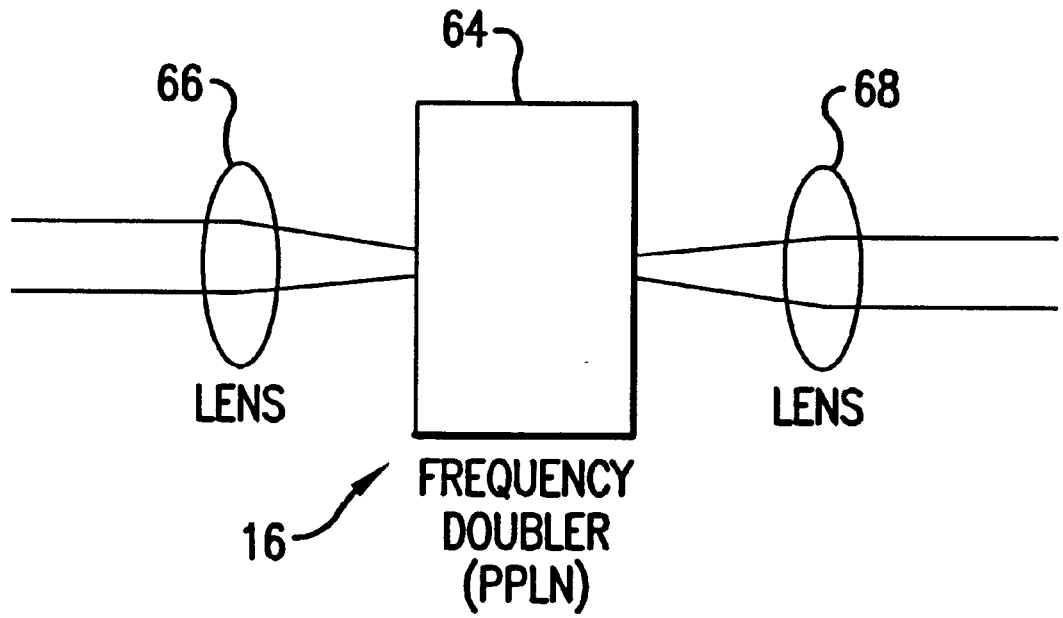
FIG. 9 is a schematic illustration of a frequency doubler that can be used in the fiber laser unit of the present invention.

Various parts forming the fiber laser unit according to the present invention are illustrated in FIG. 1. FIGS. 2 and 9 illustrate other parts forming the fiber laser unit of the present invention. As shown in FIG. 2, the fiber laser unit 10 includes the combination of a laser oscillator 12, a laser amplifier 14, a pump laser unit 18 and a coupling device 21 which optically connects the laser oscillator 12 to the laser amplifier 14. FIG. 9 illustrates a frequency converter 16 which can form a part of the laser unit for increasing the frequency of the output. The elements collectively identified by reference numeral 20 in FIG. 1 represent components that, as described below in more detail, are mounted on a common fiber bench.

With reference to FIG. 1, the laser oscillator includes the combination of a Faraday rotator mirror 22, a wavelength division multiplexer 24, a isolator 41, a lens 26, a Faraday rotator 28, a half waveplate 30, a quarter waveplate 32, a polarization beam splitter 34, a lens 36, and a mirror 38 provided with a saturable absorber 40. A cavity 1200 is defined as that portion of the laser oscillator 12 extending between the Faraday rotator mirror 22 and the mirror 38/saturable absorber 40. The lens 26, the Faraday rotator 28, the half waveplate 30, the quarter waveplate 32, the polarization beam splitter 34, the lens 36, and the mirror 38 with the saturable absorber 40 are longitudinally and coaxially aligned with one another as illustrated in FIG. 1. The laser oscillator also includes a doped optical fiber 42 which is preferably in the form of an Erbium doped single mode fiber. The doped fiber can also be a rare earth doped optical fiber such as a Neodymium doped fiber.

The laser amplifier includes the combination of a Faraday rotator mirror 44, a isolator 46, a wavelength division multiplexer 48, a lens 50, a quarter waveplate 52, a half waveplate 54, and a polarization beam splitter 56. The polarization beam splitter 56, the half waveplate 54, the quarter waveplate 52 and the lens 50 are longitudinally and coaxially aligned with one another as shown in FIG. 1. The axis of the oscillator is parallel to the axis of the amplifier. The laser amplifier also includes a doped optical fiber 62 which is preferably in the form of an Erbium doped single mode fiber. An amplifier portion 1400 of the laser unit is defined by the Erbium doped fiber 62, the multiplexer 48 and the Faraday rotator mirror 44. The doped fiber 62 can also be a rare earth doped fiber such as a Neodymium doped fiber.

The coupling device 21 includes a half waveplate 58 and an isolator 60. The coupling device 21 functions to optically couple the laser oscillator 12 to the laser amplifier 14 so that the relatively low power optical pulses produced by the laser oscillator 12 are directed to the laser amplifier 14 for purposes of amplification. The isolator 60, the half waveplate 58 and the beam splitters 34, 56 are longitudinally and coaxially aligned with one another as shown in FIG. 1. The axis of the coupling device 21 is perpendicular to the axis of the oscillator and the amplifier.

The frequency doubler unit 16 which is shown in FIG. 9 includes a frequency doubler 64 (PPLN) positioned between two lenses 66, 68. The frequency doubler 16 is designed to double the frequency of the output from the polarization beam splitter 56. The frequency doubler unit 16 may be useful for meeting the need for a specific frequency of a particular system. As shown in FIG. 1, the output from the lens 68 of the frequency doubler 16 is directed to a beam steering device 70 which then outputs short optical pulses as an output 72.

The pump laser unit 18 shown in FIG. 1 includes an AC/DC converter 76 that is connected to an AC power supply 74. The converter 76 is also connected to an on/off switch 78. The on/off switch 78 is connected to and controls operation of a pair of diode laser drivers 80, 82 and a pair of cooler drivers 84, 86. One of the diode lasers 88 is connected to the doped fiber 42 that is operatively associated with the laser oscillator 12, and this diode laser 88 is driven by one of the diode laser drivers 80. A cooler 90 is also connected to the diode laser 88 to cool the diode laser 88, and this cooler 90 is driven by one of the cooler drivers 84.

The other diode laser 92 is connected to the doped fiber 62 that is operatively associated with the laser amplifier 14, and this diode laser 92 is driven by the other diode laser driver 82. A cooler 94 is connected to this diode laser 92 to cool the diode laser 92, and this cooler 94 is driven by the other cooler driver 86. The power supply 74, the AC/DC converter 76, the on/off switch 78, the diode lasers 88, 92, the coolers 90, 94 and the drivers 80, 82, 86, 87 define the pump laser unit 18.

Referring to FIG. 1, the Erbium doped fiber 42 is spliced to an optical fiber segment 22' of the Faraday rotator mirror 22. An isolator 41 is positioned between the diode laser 88 and a wavelength division multiplexer 24. Optical fiber segments 41', 24' extending from the isolator 41 and the multiplexer 24 are spliced together. Similarly, an optical fiber segment 24" extending from the multiplexer 24 is spliced to the Erbium doped fiber 42. The isolator 41 and the multiplexer 24 introduce pump light from the diode laser 88 to the cavity 1200 while also preventing signal light from leaking back from the cavity 1200 towards the diode laser 88.

The Erbium doped fiber 62 is spliced to an optical fiber segment 48' of the wavelength multiplexer 48. The multiplexer 48 is spliced to the isolator 46 by way of respective optical fiber segments 48" and 46'. An optical fiber segment 44' of the Faraday rotator mirror 44 is spliced to an optical fiber segment 48'" of the multiplexer 48. The isolator 46 and the multiplexer 48 introduce pump light from the diode laser 92 to the amplifier portion 1400 and prevent signal light from leaking back from the amplifier portion 1400 towards the diode laser 92.

The components 26, 28, 30, 32, 34, 36, 38, 40, 50, 52, 54, 56, 58, 60, 64, 66, 68 constitute what can be referred to as bulk components while the components 22, 24, 41, 42, 44, 46, 48, 62 constitute what can be referred to as pig-tail components. The pig-tail components are components that can be spliced to one another and to the appropriate other parts of the laser with splice connections 25.

The manner of operation of the laser oscillator 12 is similar to that described in U.S. Pat. No. 5,448,579, the entire disclosure of which is incorporated herein by reference. Also, the operation of the laser amplifier 14 is similar to that described in U.S. Pat. No. 5,303,314, the entire disclosure of which is also incorporated herein by reference. While the specific details associated with the manner of operation of the overall laser unit would be known to persons skilled in the art in light of the disclosures contained in the aforementioned patents, a general description is set forth below.

When the on/off switch 78 is turned on, power is supplied to the laser diodes 88, 94 so that the laser diodes generate laser light having a wavelength of about 980 nanometers. The laser light from the diode laser 88 associated with the laser oscillator 12 is directed to the laser cavity by way of the isolator 41 and the wavelength division multiplexer 24. The laser cavity 1200 is defined as the portion of the laser oscillator 12 which generates optical oscillation and which is located between the Faraday rotator mirror 22 and the mirror 38. The isolator 41 and the wavelength division multiplexer 24 are designed to prevent the signal light in the laser cavity 1200 from leaking out back towards the laser diode 88 so that the optical light is maintained in the laser cavity and does not pass back to the diode laser 88.

The laser light then passes through the Erbium doped fiber 42 and excites the doped fiber. The light reaches the Faraday rotator mirror 22 where it is then reflected back in the doped fiber 42 with 90 degrees rotation of the polarization. The reflected light passes through the lens 26 which serves as the interface between the optical fiber and the other bulk components of the laser oscillator. The lens 26 collimates the laser light.

The collimated light passes through the Faraday rotator 28 with 45 degrees rotation of the polarization, and passes through the waveplates 30, 32, the polarizer 34 and the lens 36. The light then reflects back towards the Erbium doped fiber 42 at the mirror 38/saturable absorber 40. The polarization of the reflected signal light is rotated 45 degrees at the Faraday rotator 28 so that the polarization of the first pass in the fiber section of the laser cavity 1200 is always orthogonal to the polarization of the second pass.

Due to a variety of factors including temperature changes and other environmental conditions, the polarization state of the laser light can always change. The combination of the Faraday rotator 28 and the Faraday rotator mirror 22 is designed to correct for errors or changes in the polarization of the signal light to maintain a certain polarization state of the light. The two waveplates 30, 32 work together to rotate the plane of polarization of the laser light to the desired degree while the beam splitter 34 ensures that only a part of the signal light having a certain polarization state will be output to the laser amplifier. By controlling the half and quarter waveplates 30, 32, it is possible to control how much of the optical energy generated in the laser oscillator is outputted to the laser amplifier by way of the polarization beam splitter 34. The lens 36 is designed to focus the laser light from the beam splitter 34 onto the saturable absorber 40 associated with the mirror 38. The saturable absorber 40 attached to the mirror 38 is designed to cause the stimulated laser emission of the doped fiber 42 to start pulsing automatically within the laser cavity 1200. The pulsation will result in passive mode locking so that 250–450 femtosecond pulses at 1550 nanometers are obtained from the polarizing beam splitter 34.

At the time the on/off switch is turned on, the diode laser 92 associated with the laser amplifier outputs pump light at a wavelength of about 1480 nanometers which passes through the isolator 46 and the wavelength division multiplexer 48. The isolator 46 and the wavelength division multiplexer 48 prevent signal light from being directed back to the diode laser 92.

The pump light passing through the wavelength division multiplexer 48 passes through the doped fiber 62 and excites the doped fiber 62.

The laser oscillator produces optical pulses having a low power with such optical pulses being directed out of the laser oscillator by way of the polarization beam splitter 34. This low power optical pulse passes through the isolator 60 and the half waveplate 58 which serve as the coupling device that couples together the laser oscillator 12 and the laser amplifier 14. The isolator 60 is designed to only allow one-way passage of laser light from the beam splitter 34 to the beam splitter 56. By appropriately controlling the half waveplate 58, polarization of the optical pulse is rotated so that the pulses from the laser oscillator goes towards the doped fiber 62. The light passes through the Erbium doped fiber 62 for amplification, passes through the multiplexer 48 and reflects back at the Faraday rotator mirror 44. By virtue of the Faraday rotator mirror 44, polarization of the returning light is rotated at 90 degrees so that a polarization of the first pass in the amplifier portion 1400 is always orthogonal to the polarization of the second pass.

The Faraday rotator mirror 44 is designed to correct for errors or changes in the polarization of the signal light to maintain a certain polarization of light. The reflected light at the Faraday rotator mirror 44 is again amplified by the doped fiber 62 and is directed to the lens 50. The lens 50 serves as the interface between the doped fiber 62 and the bulk components forming a part of the laser amplifier. The laser light that is collimated by the lens 50 passes through the quarter waveplate 52 and the half waveplate 54. The waveplates 52, 54 are adapted to work together to rotate the plane of polarization of the laser light so that only light having a certain polarization will be output from the polarization beam splitter 56. By controlling the waveplates 52, 54, it is possible to control how much output is produced by the laser.

Through this operation, the low power optical pulse produced by the laser oscillator 12 is amplified in the doped fiber 62. The result is an amplified optical output from the polarization beam splitter 56. It is understood that the laser can optionally include the frequency converter or doubler 16 shown in FIG. 1, should the particular needs of a given system require a doubling of the frequency. However, the frequency doubler 16 may be omitted.

The laser light exiting the polarization beam splitter 56 or the frequency doubler 16 is then directed to a beam steering device 70 shown in FIG. 1 and then outputted as an amplified optical laser pulse 72. The output can have a wavelength of about 780 nanometers and a pulse width of approximately 150–250 femtosecond.

Figure 4:
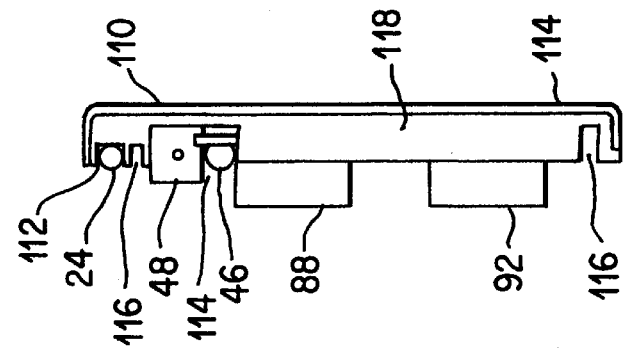
FIG. 4 is a right side view of the fiber tray illustrated in FIG. 3.

FIGS. 3–7 illustrate the particular way in which the laser unit of the present invention is constructed to provide a relatively compact configuration. The laser unit includes a mounting structure for mounting all of the components of the laser on a single structure. The mounting structure with the attached components is housed in a housing. As seen initially with reference to FIG. 3, which is a bottom plan view of the laser unit in which the base forming a part of the housing has been removed, the diode laser 88 that is operatively associated with the laser oscillator 12 and the diode laser 92 that is operatively associated with the laser amplifier 14 are mounted on a fiber tray 110. As seen in FIG. 4, the fiber tray 110 is generally U-shaped as seen from the side. The diode laser 88 operatively associated with the laser oscillator 12 and the diode laser 92 operatively associated with the laser amplifier 14 are mounted in a parallel fashion in generally abutting relation to one another so that the spacing between the two diode lasers 88, 92 is minimized.

Figure 3:
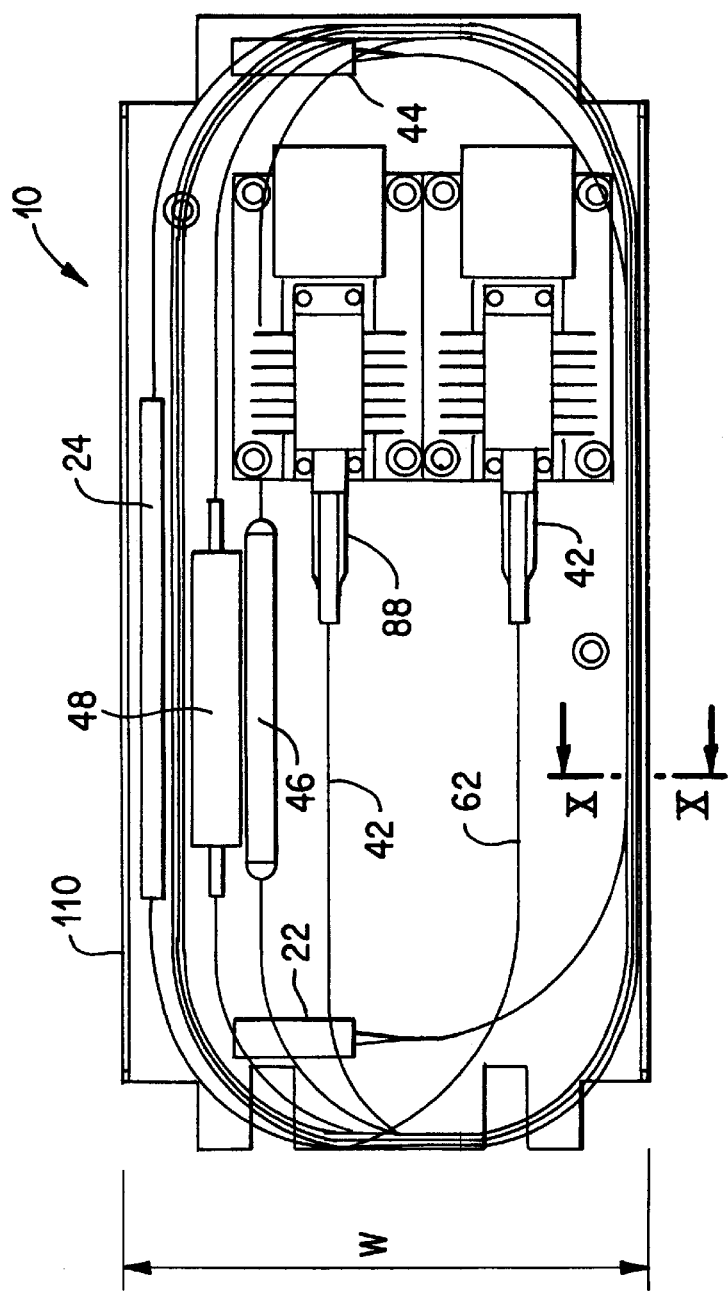
FIG. 3 is bottom plan view of the fiber laser according to the present invention with the base removed illustrating the fiber tray.

The Erbium doped fiber 42 that is operatively connected to the laser oscillator 12, and the various fiber segments extending between the components 22, 24, 26, 41 are wound around the internal periphery of the fiber tray 110 in a counter-clockwise manner as shown in FIG. 3. The doped fiber 62 that is operatively connected to the laser amplifier 14, and the various fiber segments extending between the components 44, 46, 48, 50 are wound around the internal periphery of the fiber tray 110 in a clockwise direction as seen with reference to the illustration in FIG. 3. Thus, the Erbium doped fibers 42, 62 are wound around the periphery of the fiber tray 110 in opposite directions.

The Erbium doped fibers 42, 62 are wound in such a manner that the wavelength division multiplexer 24, the wavelength division multiplexer 48 and the isolator 46 are positioned generally parallel to the sides of the fiber tray 110 and extend generally in the lengthwise direction of the fiber tray 110 as shown in FIG. 3. The fiber tray 110 is appropriately dimensioned and the laser diodes 88, 92 are positioned on the fiber tray 110 to ensure that the curvature imparted to the fibers 42, 62 is not less than or smaller than the critical radius. Thus, at all points along the length of each doped fiber 42, 62, the radius of curvature of the fibers 42, 62 is not less than the critical radius of the respective doped fiber.

It can also be seen from FIG. 3 that both diode lasers 88, 92 are oriented in the same direction, are parallel to one another and extend towards the same side of the laser bench 110. Ideally, the width W of the laser bench 110, which corresponds substantially to the overall width of the laser unit, would be equal to the critical radius of the doped fibers 42, 62, assuming the critical radii of the doped fibers are substantially the same. To the extent the critical radii of the doped fibers differ, the overall width W would ideally be equal to the largest critical radius of the two doped fibers 42, 62. However, in practice, because of the size of the diode lasers 88, 92, and the space required to house such diode lasers, the overall width W is slightly greater than the critical radius of the doped fibers 42, 62 (in the event the doped fibers possess the same critical radius) or is slightly greater than the largest critical radius of the two doped fibers.

Figure 10:
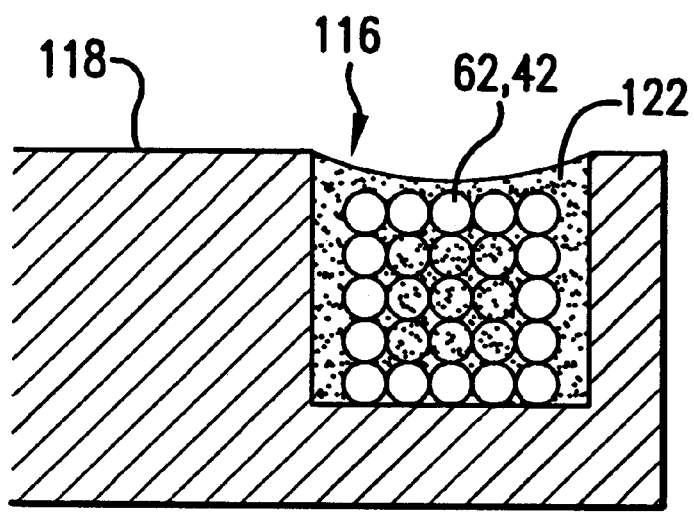
FIG. 10 is a cross-sectional view taken along the section line X-X in FIG. 3.

As mentioned above, each of the doped fibers 42, 62 is wound around the internal periphery of the fiber tray 110 so that each doped fiber consists of adjacent windings. A cushion member 118 made of urethane foam is pushed into or placed in the internal periphery of the fiber tray 110 as shown in FIG. 10. A plurality of recesses 112, 114, 116 are provided to encase or receive the pig-tailed components 22, 24, 41, 44, 46, 48 and the doped fibers 42, 62. The doped fiber windings can be secured in place with respect to the cushion member 118 by providing a plurality of spaced apart adhesive areas in the recess 116. As the doped fibers 42, 62 are wound around in the recess 116, the fibers can be pressed against the spaced apart adhesive areas to thereby secure the windings in place relative to the cushion member 118. As shown in FIG. 10, which is a cross-sectional view along the section line X—X in FIG. 3, the fibers 42, 62 are encased or surrounded in a silicon potting material 122. In this way, because both the cushion member 118 and the silicon potting material 122 are vibration absorbing materials, the fibers 42, 62 are inhibited or prevented from vibrating so that undesirable optical noises are not generated.

Figure 5:
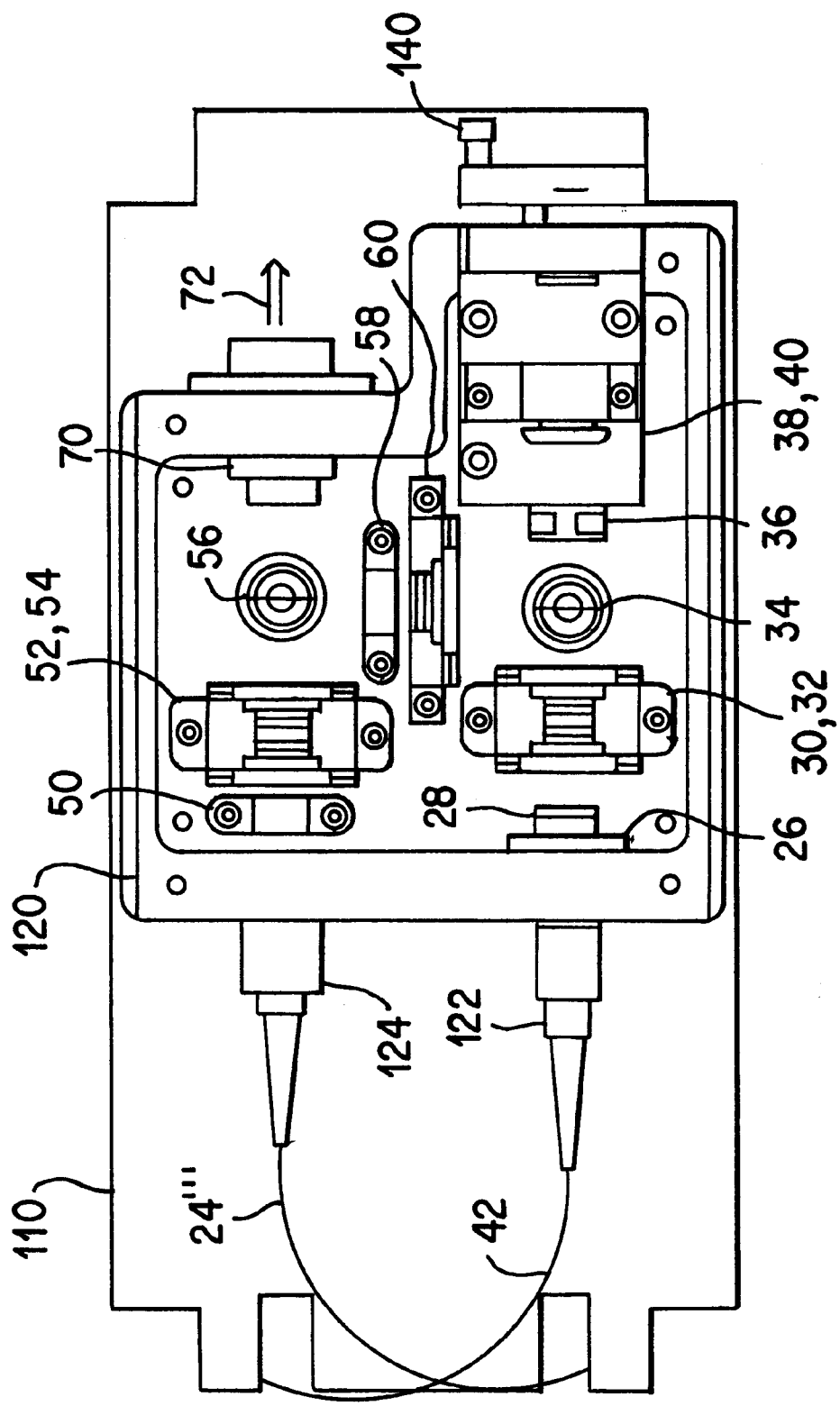
FIG. 5 is a top plan view of the fiber laser according to the present invention with the cover removed illustrating the interior of the fiber bench.
Figure 6:
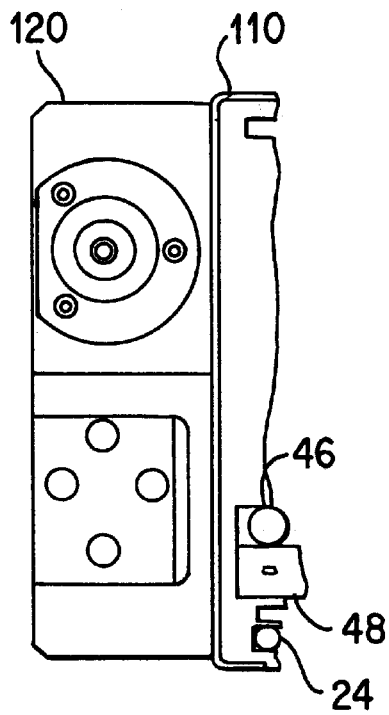
FIG. 6 is a right side view of the fiber laser shown in FIG. 5 specifically illustrating the fiber bench and the fiber tray.
Figure 7:
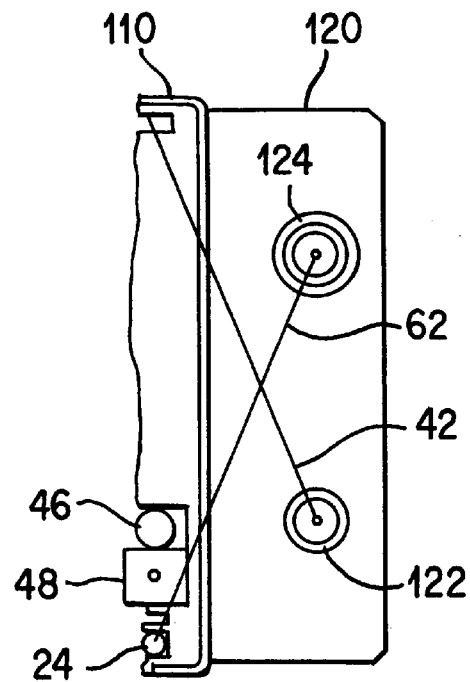
FIG. 7 is a left side view of the fiber laser shown in FIG. 5 specifically illustrating the fiber bench and the fiber tray.

FIG. 5 illustrates the laser unit of the present invention as seen from the top, with the cover forming a part of the housing being removed. The various bulk components 26, 28, 30, 32, 34, 36, 38, 40 forming a part of the laser oscillator 12, the various bulk components 50, 52, 54, 56 forming a part of the laser amplifier 14, and the bulk components 58, 60 forming the coupling mechanism between the laser oscillator 12 and the laser amplifier 14 are all mounted on a fiber bench 120. The fiber bench 120 and the fiber tray 110 together define the mounting structure on which all of the components of the laser oscillator 12, the laser amplifier 14, and the coupling mechanism 16 are mounted.

As seen in FIG. 5, the fiber bench 120 defines an enclosing structure that is secured to the fiber tray 110. The bulk components 26, 28, 30, 32, 34, 36, 38, 40 forming a part of the laser oscillator 12, the bulk components 50, 52, 54, 56 forming a part of the laser amplifier 14, and the bulk components 58, 60 forming the coupling device 16 are all mounted within the enclosing structure of the fiber bench 120. One side of the fiber bench 120 is provided with connecting elements 122, 124 to provide a connection for the doped fibers 42, 62 so that the fibers 42, 24''' can interface with the respective bulk components. An adjustment mechanism in the form of a screw 140 is provided for permitting adjusting the position of the mirror 38/absorber 40. The mirror 38/absorber 40 can be mounted on a movable block to which is operatively connected the screw 140 so that adjustment of the screw 140 causes movement of the mounting block and movement of the mirror 38/absorber 40. Through adjustment of the screw 140, the mirror 38/absorber 40 can be positioned at the focal point of the lens 36, or can be positioned in front of or behind the focal point of the lens 36 to achieve optimal performance of the laser oscillator 12.

It can be seen that the bulk components 26, 28, 30, 32, 34, 36, 38, 40 forming a part of the laser oscillator 12 are longitudinally oriented, and the bulk components 50, 52, 54, 56 forming a part of the laser amplifier 14 are also longitudinally oriented, with the two sets of components being arranged generally parallel to one another. Further, the bulk components 26, 28, 30, 32, 34, 36, 38, 40 forming a part of the laser oscillator 12 and the bulk components 50, 52, 54, 56 forming a part of the laser amplifier 14 are arranged generally parallel to the diode lasers 88, 92.

Mounting the bulk components 26, 28, 30, 32, 34, 36, 38, 40 forming a part of the laser oscillator 12, the bulk components 50, 52, 54, 56 forming a part of the laser amplifier 14, and the coupler elements 58, 60 that optically connect or couple the laser oscillator 12 to the laser amplifier 14 on the same mounting structure (i.e., the fiber bench 120) facilitates the construction of a laser unit that is relatively small and compact. Indeed, by mounting all of the parts of the laser unit on a single mounting structure defined by the fiber tray 110 and the fiber bench 120, the overall size of the laser unit is kept at a minimum. Also, by mounting the bulk components 26, 28, 30, 32, 34, 36, 38, 40 forming a part of the laser oscillator 12, the bulk components 50, 52, 54, 56 forming a part of the laser amplifier 14, and the coupler elements 58, 60 on the same mounting structure, optical alignment can be easily adjusted and then fixed to avoid subsequent changes after adjustment. The isolator 60 helps prevent undesired interference between the laser oscillator 12 and the laser amplifier 14.

In addition, the fiber tray 110 forming a part of the mounting structure is sized to ensure that when the doped fibers 42, 62 are wound around the fiber tray 110, the curvature or bending of the fibers 42, 62 does not result in a radius of curvature at any point along the length of the fibers 42, 62 that is less than the critical radius. Thus, damage to the doped fibers 42, 62 and signal degradation do not occur.

Figure 8:
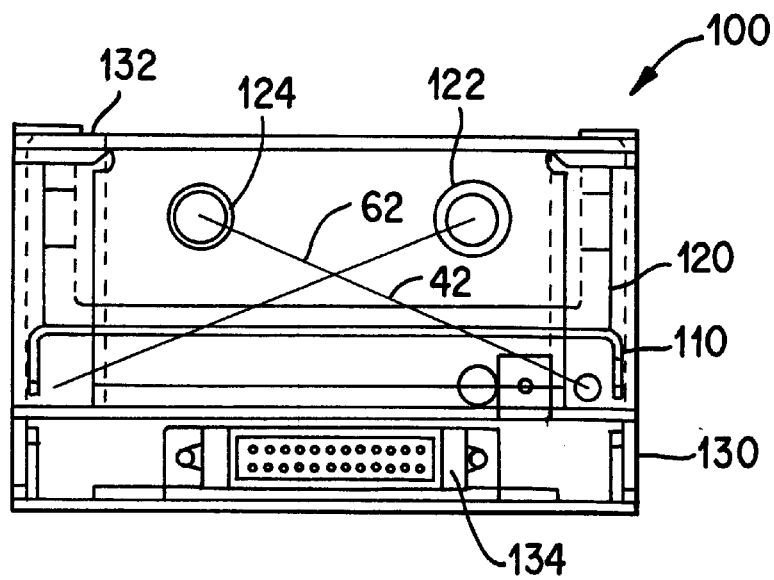
FIG. 8 is a right side view of the fiber laser according to the present invention illustrating the housing and a portion of the components within the housing.

FIG. 8 illustrates the overall laser unit 100 of the present invention with some of the internal components of the laser unit being depicted. As can be seen, the laser unit 100 includes a housing defined by a base 130 and a cover 132. The mounting structure on which are mounted all of the components of the laser unit is housed within the housing. The lower portion of the base 130 is provided with a connection interface 134 which can serve as an electrical power connection as well as an output for various data such as temperature data that would be used to control the coolers 90, 94 shown in FIG. 1 that are operatively associated with the diode lasers 88, 92. In the illustration in FIG. 3, the coolers 90, 94 are integrally associated with the diode lasers 88, 92 respectively.

Figure 11:
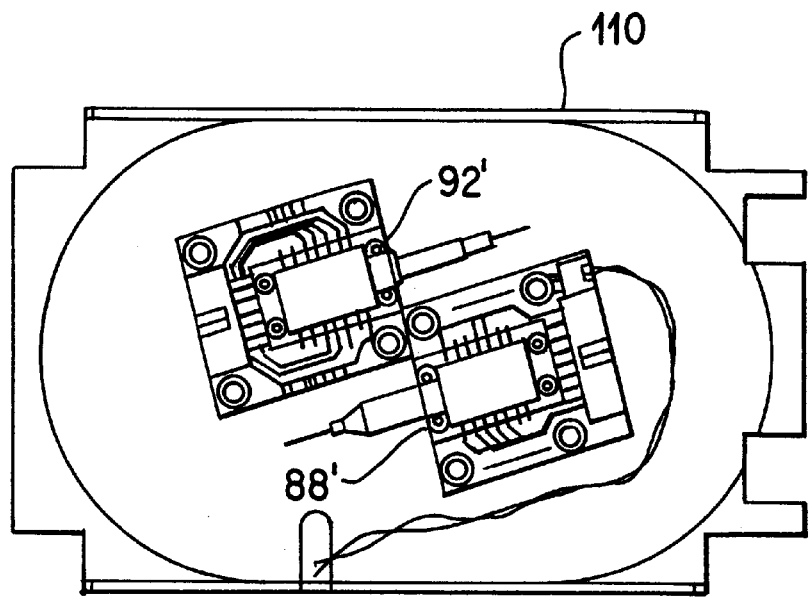
FIG. 11 is a plan view of an alternative arrangement and orientation for mounting the diode lasers.

FIG. 11 illustrates another embodiment of a compact laser unit according to the present invention that is substantially similar to the embodiment described above, except that instead of the two diode lasers 88, 92 being oriented in the same direction, the diode lasers 88', 92' in the embodiment shown in FIG. 11 face in different directions. In this embodiment shown in FIG. 11, the doped fibers can be wound around the fiber tray in the same direction rather than in opposite directions as is the case with the arrangement depicted in FIG. 3. The embodiment shown in FIG. 11 is otherwise the same as that described above and provides the same compact laser unit as that described above.

The principles, the preferred embodiment, and the mode of operation of the present invention have been described in the foregoing specification. However, the invention which is intended to be protected is not to be construed as limited to the particular embodiments disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A fiber laser unit comprising:
   a laser oscillator for generating an optical pulse, the laser oscillator including a first optical fiber;
   a laser amplifier connected to the laser oscillator for amplifying the optical pulse produced by the laser oscillator, the laser amplifier including a second optical fiber; and
   a common holder where the first and second optical fibers are wound.

2. A fiber laser according to claim 1, wherein the laser oscillator and the laser amplifier are mounted on a common mounting structure.

3. A fiber laser according to claim 1, wherein the common holder is a fiber tray, the first and second optical fibers being wound around a periphery of the fiber tray.

4. A fiber laser according to claim 3, wherein the wound first and second optical fibers are covered with vibration absorbing material.

5. A fiber according to claim 3, wherein the first and second optical fibers are wound in opposite directions around the periphery of the fiber tray.

6. A fiber laser according to claim 1, wherein the first and second fibers are Erbium doped fibers.

7. A fiber laser according to claim 6, wherein the first and second fibers are single mode fibers.

8. A fiber laser comprising:
   a first pump laser for producing pump light;
   a laser oscillator connected to the first pump laser for generating an optical pulse, the laser oscillator including a first optical fiber;
   a second pump laser for producing pump light;
   a laser amplifier connected to the second pump laser and to the laser oscillator for amplifying the optical pulse produced by the laser oscillator, the laser amplifier including a second optical fiber;
   the first and second pump lasers being mounted on a mounting structure and being substantially parallel to one another.

9. A fiber laser according to claim 8, wherein the first and second optical fibers are wound on a common holder.

10. A fiber laser according to claim 8, wherein the first and second optical fibers are wound around the mounting structure.

11. A fiber laser according to claim 9, wherein the laser oscillator and the laser amplifier are mounted on the mounting structure.

12. A fiber laser according to claim 8, wherein the first and second fibers are single mode fibers.

13. A fiber laser according to claim 8, wherein the laser oscillator includes a plurality of bulk components and said laser amplifier includes a plurality of bulk components, the bulk components of the laser oscillator being aligned parallel to the bulk components of the laser amplifier.

14. A fiber laser according to claim 13, wherein the first and second lasers are oriented parallel to the bulk components of the laser oscillator and the bulk components of the laser amplifier.

15. A fiber laser comprising:
   a laser source for producing laser light;
   a laser oscillator connected to the laser source for producing optical pulses, the laser oscillator including a plurality of bulk components;
   a laser amplifier connected to the laser source, the laser amplifier including a plurality of bulk components;
   a coupler for optically coupling the laser oscillator to the laser amplifier, with the optical pulses produced by the laser oscillator being directed to the laser amplifier for amplification to produce amplified optical pulses as an output;
   a common mounting structure on which are mounted the bulk components of the laser amplifier, the bulk components of the laser oscillator and the coupler.

16. A fiber laser according to claim 15, wherein the laser oscillator includes a first optical fiber connecting the bulk components of the laser oscillator to the laser source, the laser amplifier including a second optical fiber connecting the bulk components of the laser amplifier to the laser source, the first and second optical fibers being wound around a common holder.

17. A fiber laser according to claim 16, wherein the mounting structure includes a fiber bench and a fiber tray that are connected to one another, the bulk components of the laser oscillator and the bulk components of the laser amplifier being mounted on the fiber bench, the first and second optical fibers being wound around the fiber tray.

18. A fiber laser according to claim 16, wherein the wound first and second optical fibers are covered with vibration absorbing material.

19. A fiber laser according to claim 16, wherein the first and second optical fibers are wound around the common holder in opposite directions.

* * * * *